Figure 1:
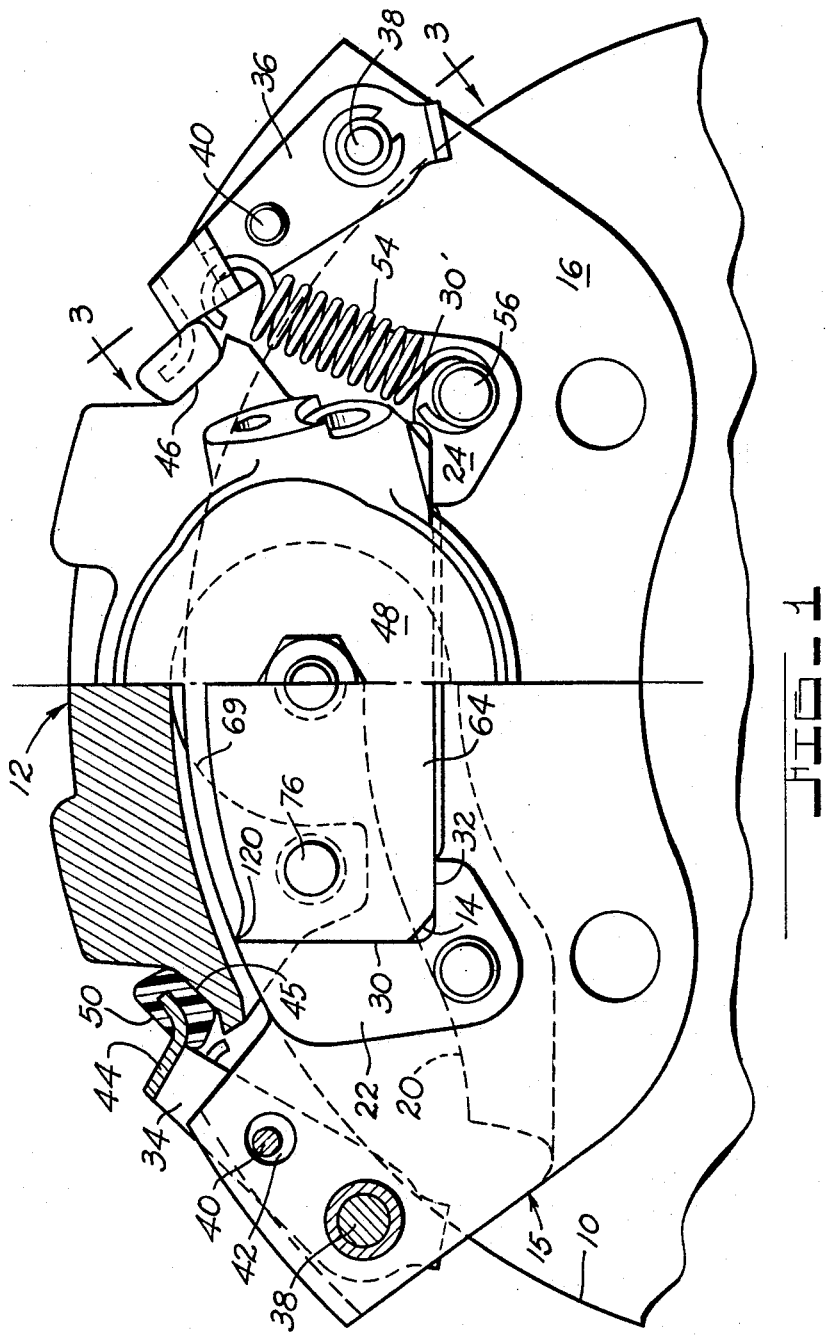

Sept. 20, 1966  R. THIRION  3,273,676
SPOT-TYPE DISC BRAKES
Filed Nov. 30, 1964  2 Sheets-Sheet 1

INVENTOR.
RENÉ THIRION.
BY
Richard G. Geib
ATTORNEY.

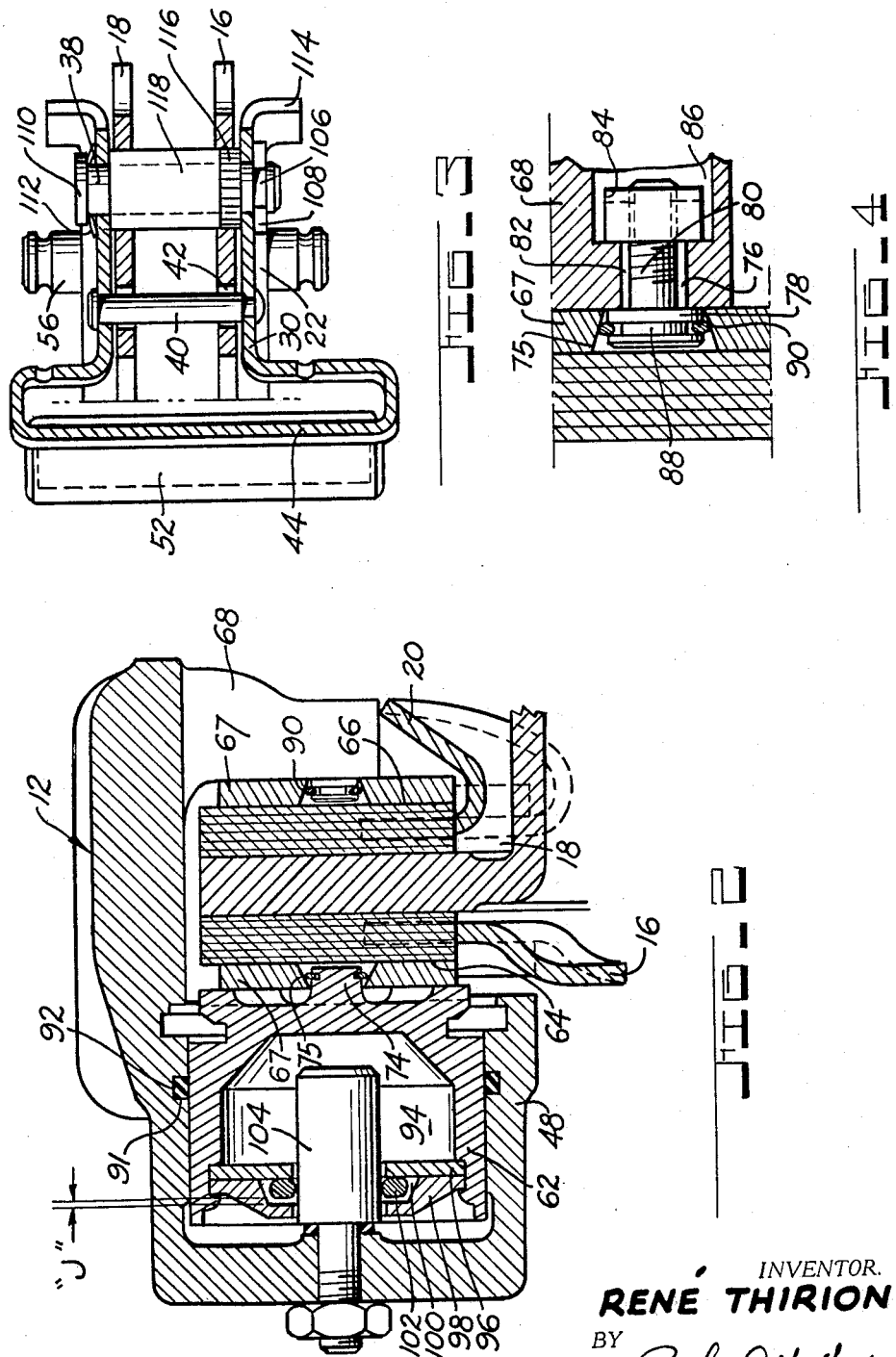

3,273,676
SPOT-TYPE DISC BRAKES
René Thirion, Paris, France, assignor to Societe Anonyme D.B.A., Paris, France, a company of France
Filed Nov. 30, 1964, Ser. No. 414,559
Claims priority, application France, Dec. 4, 1963, 955,951
7 Claims. (Cl. 188—73)

This invention relates to disk brakes with a floating stirrup of the type in which the stirrup and the friction pads are located in a recess formed in the U-shaped fixed support straddling the disk, the friction pads being connected to the stirrup to be guided by radial displacements of the latter whereby resilient means connected to the fixed support bias the stirrup as well as the friction pads radially towards the center of the brake into a stable position defined by coming of the friction pads into engagement with the fixed support while enabling an axial movement of the stirrup and of the friction pads.

In the brakes of this type known up to the present, the resilient means were formed by yieldingly distortable members such as rubber blocks or tubes compressed between the stirrup and the elements of the fixed support which encompass the said recess.

In order to enable the radial removal of the stirrup and of the friction pads namely for the replacement of the pads, said elements which extend over the outer periphery of the recess are retractable and for instance are formed by the end of levers pivotally mounted on the fixed support on each side of the recess and which are normally locked in operating position by pins acting as clevis means. To reduce the radial dimensions of the brake, the distance between the respective levers and the stirrup between which are compressed the said rubber blocks is small and due to tolerances of manufacture in large quantities. This distance can vary from one brake to another which has as necessary consequence the variations of the compression rate of the rubber members. Now if the rubber blocks are not subjected to a sufficient compression, the force which they exert onto the stirrup is small and under the action of inertia energy resulting from sudden displacement of the fixed support, the stirrup and the friction pads are displaced radially with respect to the fixed support against which they are brought to bear with noise. On the contrary, if the rubber blocks are compressed to a too high value, friction forces are exerted between the friction pads and the fixed support and the resilient means is not sufficiently powerful to disengage the friction pads after each braking operation which results in the remaining of the friction pads in contact with the disc and in the creation of a disagreeable noise. This drawback is amplified by the fact that the rubber blocks which take abutment onto the stirrup slow down the axial displacement of the latter and consequently that of the friction pad which is fixed with respect to the stirrup, the rubber having a relatively important coefficient of friction. It results therefrom that the brakes of this type manufactured in series do not function correctly in operation. Since on the other hand, the properties of the rubber blocks vary in the time it is practically impossible to realize a correct operation of the brake during the whole service life of the latter.

An object of the present invention is to provide a disc brake of the type described above in which the above drawbacks are eliminated and which comprises means adapted to guide positively the friction pads and the stirrup by exerting on the levers a controllable effort which remains constant in time while enabling an easy replacement of the friction pads.

The disc brake embodying the invention comprises two levers freely pivoted on the fixed support and which are respectively located at the opposite sides of the recess, said levers being biased toward the axis of the disc by springs connected to the fixed support to thus take abutment onto the stirrup and urge the latter towards the center of the brake and apply the friction pads onto the bottom of the recess; the said springs are selected in such a manner that the effort which they apply to the levers varies slowly in function of the distance between the anchoring points of said springs so that the levers are subjected to efforts which have a substantially constant value from one brake to another in spite of the difference in position of the levers on the fixed support due to the tolerances of manufacture.

A block of plastic material having a low coefficient of friction such as Vulkollan is preferably arranged between the end of the levers and the surfaces on the stirrrup onto which said levers take support to eliminate the noise which will not fail to be created at the contact of the levers with the stirrup when the stirrup moves axially with respect to the fixed support.

To avoid any escape of the stirrup and of the friction pads from the recess formed in the fixed support in case of failure of the springs, there is provided on each of the levers a pivot pin and a safety pin secured to the respective lever parallely to the pivotal axis of the latter. The safety pin is located in a hole formed in the fixed support which hole is a size larger than the diameter of the safety pin to enable a certain angular amplitude of movement of the levers in both directions from its normal operative position and limit the outward displacement of the levers to hold the stirrup in the recess formed in the fixed support. One of the pins should be arranged so as to be removable in order to enable a retraction of the levers by pivoting same about the other pin to free the outer periphery of the recess in the fixed support when it is desirable to dismount the stirrup and the friction pads.

In a preferable embodiment of the invention the pivot pin on a pivotal axis of the levers which is arranged at one end of the latter is arranged to be removable and the spring connected to the lever is a tension spring attached to a point of the lever located near the safety pin of the latter between said safety pin and the free end of the lever. With this arrangement pivoting the lever upon withdrawal of the pivot pin will cause very little expansion of the spring until it is dead center with the lever so that thereafter the spring will snap the lever to its retracted position.

According to a feature of the invention the edge of the metal reinforcement plate which borders the recess formed on the outer periphery of the friction pad extends till the small sides of the friction pad portion formed as a rectangle and this metal plate participates as well as the friction lining in the transmission of the braking torque to the fixed support. To connect the friction pad in a positive manner to the piston member and to the pressure member (plate) of the stirrup, recourse is made to a coupling comprising on one member namely on the metal plate a wedge-shaped hole and on the second member namely on the piston or pressure member, a projection equipped with a resilient ring or similar means which extends into this hole against the resistance opposed by said means which thus couples in a positive manner the respective friction pad to the element of the stirrup.

According to another feature of the invention the adjusting device is formed by a friction ring which engages with a pin fixed to the head of the cylinder, said friction ring being located in a housing formed between a washer and an adjacent cup, both crimped in the opened end of a cylindrical portion forming part of the piston. The distance between said ring and the bottom of the housing determines the clearance space of the brake.

Other features and advantages of the brake embodying the invention will appear from the following specification with reference to the accompanying drawings in which:

The FIG. 1 is a side view of a disc brake embodying the invention; on the left hand side of the said figure certain brake elements are shown in section along the plane of the disc.

The FIG. 2 is a radial section taken along the axis of the fluid pressure responsive cylinder.

The FIG. 3 is a partial section taken on line 3—3 of FIG. 1, and

The FIG. 4 is a partial section illustrating diagrammatically the manner of securing of the friction pads.

The brake shown in the drawings comprises a disc 10 secured to the hub of the wheel. A stirrup 12 straddles the disc and is located in a recess 14 formed in the fixed support 15 having a U-shaped section and formed by two limbs 16 and 18 located on the opposite side of the disc outside of the recess. The lower portion of the limb 18 is formed with a flange 20 to increase the rigidity of the fixed support. The lower portion of the limb 16 is fixed by screws to a fixed element not shown which may be formed by an axle casing.

Reinforcement members 22, 24 made in iron sheet are respectively welded to the limbs of the fixed support on the opposite sides of the recess 14 and have a L-shaped profile in register with the vertical edge 30 of the recess 14 of the fixed support and with the adjacent horizontal portion 32 forming the bottom of the recess, to increase the anchorage surface for the friction pads.

The movement of the stirrup is guided by a pair of levers 34, 36 formed by two arms located on the opposite sides of the fixed support 15 and which are pivotally mounted on the latter by means of removable pin 38, the pivotal movement of the levers on this pin 38 being limited by the safety pin 40 permanently secured to the arms of the lever. The pin 40 fixed to the levers extend through openings 42 provided in the fixed support 15 and having such a diameter that normally the pin 40, as shown on the left hand portion of FIG. 1, does not come into contact with the edges of the openings 42 when the brake is in operating condition so that in no case the levers can free the peripheral opening of the recess 14 which prevents the escape of the stirrup when the pins 38 and 40 are mounted in place.

These levers are preferably formed with an extension 44 which engages with the respective seat 45, 46 provided on the stirrup; the seats may directly be provided on the stirrup casting or are preferably formed by a surface machined parallel to the axis of the cylinder carried by the stirrup. The lever extensions 44 carry blocks 50, 52 made of plastic material for instance Vulkollan, sufficiently rigid to be considered as not being subjected to distortion and having a low coefficient of friction in order not to hamper the movement of the stirrup. The length of the extensions 44 is substantially larger than that of the fixed support 15 in order to improve the guiding of the stirrup. These extensions 44 can be located symmetrically with respect to the fixed support or asymmetrically as shown in FIG. 3 to conform to the asymmetric shape of the stirrup. Springs 54 connected on the one hand to the fixed support 15 on the other hand to the arms of the levers 34, 36 urge the stirrup 12 toward the bottom 32 of the recess.

In the embodiment shown on the drawings, the springs 54 are hooked to projection 56 secured to the limbs 16 and 18 of the fixed support 15. These springs loading the levers could be hooked to the lugs formed on the reinforcement members 22, 24 of the fixed support. The springs located adjacent the limb 18 could be hooked to the reinforcement flange 20. The flexibility of the springs 54 and their load in free state is preferably selected in such a manner so as to obtain an effect constant in time and sufficient to avoid an untimely displacement with respect to the fixed support of the movable saddle comprising the stirrup. The attachment point of the spring is placed at a distance sufficiently large with respect to the safety pin 38 in order to apply an important force to the stirrup and sufficiently near to said pin 40 in order that upon dismounting of the stirrup to replace the friction pads, the elongation of the springs taking place upon rocking of the levers on the safety pin 40 be sufficiently small in order to suppress the risk of permanent distortion of the springs which therefore insure a constant action. It is to be noted that when the removable pin 38 is withdrawn the length of the springs 54 is shortened due to the return of said springs to their normal position to an extent corresponding to the amplitude of the clearance provided around the permanent pin 40 and when the levers are retracted by rocking them to thus move the respective springs to the opposite side of the pin 40 with respect to the position occupied by said spring when the brake is in operating position, the elongation of the spring in this attitude is in fact smaller or of the same amplitude as that to which this spring is subjected when the springs are in operating position, i.e., when the brake is ready to operate. It is to be noted that in this construction the permanent pin 40 acts as a safety device to prevent in case of failure of the springs the escape of the stirrup from the recess.

The stirrup 12 is formed by a casting. A cylinder 48 is formed in the casting and located on one side of the disc. A piston 62 is reciprocably mounted in the cylinder 48, which piston, upon pressurization of the cylinder, brings the adjacent friction pad 64 into engagement with one of the faces of the disc. The action of the pressure onto the head of the cylinder results in a displacement of the stirrup and in the application onto the opposite surface of the disc of a second friction pad 66 secured to the stirrup member 68 located on the side of the disc opposite to that on which is located the cylinder.

The friction pads include three straight line edges intended to cooperate with the edges 30, 30′, 32 of the recess 14. The outer edge of the friction pads has a generally cylindrical shape in order to correspond to the profile of the inner portion of the stirrup. The inner angles of the friction pads are bevelled to conform to the circular shape of the adjacent corners of the recess 14. Each friction pad is formed with a metal reinforcement plate 67 the inner surface of which is covered with friction lining for instance by curing or by molding. The reinforcement plate 67 has a height slightly smaller than that of the lining in order to form on the outer periphery of the friction pad a groove 69 intended to accommodate the round corner left between the peripheral portion of the stirrup and the portions thereof facing the disc.

The piston 62 is formed with a central integrally made projection 74 extending into a hole 75 in the adjacent friction pads 64. The stirrup pressure member 68 is formed with two projections 76 which can either be inserted into holes formed in the pressure member 68 or secured by means of screws, said projections extending into holes formed into the friction pad. A projection of this type is shown on FIG. 4. The projection 76 is formed with a collar 78 and with a threaded pin 80 extending into the hole 82 formed in the stirrup pressure member 68, said hole 82 having a diameter smaller than that of the collar 78; the threaded pin 80 is locked by a nut 84 which can be preferably located in a recess 86 formed in the pressure member 68.

In this embodiment, the holes 75 formed in the friction pads are wedged shaped and taper inwardly from the friction pad abutment surface provided on the piston viz. on the pressure member 68. The corresponding projections have a cylindrical shape, the diameter of the collar 78 being slightly smaller than that of the smallest diameter section of the tapered hole—designated as entry port—and they are formed with a groove 88 in which is mounted a split yielding ring 90, the inner diameter of the groove being such that this ring which has interior diameter larger than that of said entry port is adapted to contact with said groove in order to enable the mounting of the projection into the corresponding hole of the friction pad. When the friction pad is mounted, the expansion of said split ring creates an effort tending to apply the friction pad onto the corresponding anchorage surface formed on the piston viz. on the stirrup.

Through the intermediary of the projections 74 and 76 the springs 54 apply the friction pads onto the seats 32 formed at the bottom of the recess 14. The load of the springs is selected in such a manner in order that the connection provided by said springs be sufficiently rigid to avoid any untimely movement of the friction pads and of the stirrup under the action of vibrations and various accelerations intervening due to the movement of vehicle.

The sealing of the piston 62 mounted in the cylinder 48 is realized by an O-ring 91 located in a groove 92 formed in the cylinder body 48. Besides the piston is formed with a blind recess 94 in the opening of which are crimped two members namely a washer 96 and a cup 98, the said cup forming a housing 100 in which is located a friction ring 102 of a predetermined width which frictionally engages a pin 104 secured to the bottom of cylinder 48. The clearance "j" formed between the bottom of the cup and the adjacent face of the friction ring 102 corresponds to the predetermined clearance reserved to the piston.

When liquid under pressure is forced into the cylinder 48, the piston 62 is urged towards the disc and brings the corresponding friction pad 64 into engagement with the adjacent surface of the disc; at the same time a general displacement of the stirrup brings the friction pad 66 into engagement with the opposite face of the disc.

During the general displacement of the stirrup, the seats 45 and 46 on the stirrup slide on the blocks 50 and 52, this sliding movement being facilitated by the small coefficient of friction of the material selected for these blocks.

Consecutive to the relative movement between the piston and the stirrup, a yielding distortion of the O-ring 91 takes place. On the other hand the piston carries therewith the cup 98 which moves with respect to the friction ring 102 which in normal position is in engagement with the washer 96. If the braking stroke exceeds the clearance "j" reserved between the cup 98 and the friction ring 102, the cup 98 carries therewith the friction ring 102 which is thus brought to slide on the pin 104. When the brake is released, the O-ring 91 recovers its normal shape and moves back the piston until the washer 96 is brought to take abutment onto the friction ring 102 exerting onto the pin 104 a friction force higher than the force applied by the O-ring 91; the return of the piston thus restores the clearance "j." Simultaneously there takes place the return movement of the stirrup which is facilitated by the small friction exerted by the blocks 50 and 52 and which results in disengagement of the friction pad 66 from the respective surface of the disc.

When the friction linings are worn and it is necessary to replace them, the removable pin 38 is withdrawn. The latter is formed with a groove 106 in which is mounted a split resilient ring 108. To withdraw the pin 38 a pressure is exerted onto the end 110 of the pin 38 in order to flatten a resilient washer 112 and enable an easy removal of the split ring 108, said washer having as function the application of the split ring 108 onto the corresponding arm of the lever and provide a rigid assembly to avoid wobbling which is a source of noise. The split ring 108 is then withdrawn which enables the withdrawal of pin 38. The lever loaded by the spring 54 is pulled by this spring until the safety pin 40 takes abutment onto the edge of the opening 42 drilled in the limbs of the fixed support 15, which results in partial release of the stress exerted on the springs, since the pin 40 is normally spaced away from the lower edge of the opening 42. The safety pin 40 being very close to the anchorage point of the springs 54, it is then possible to rock the levers on the pin 40 and bring them beyond the upper dead center without the stress exerted on the springs 54 attains at any moment an excessive value. The levers are then kept in retracted position by the springs 54 and liberate the entry of the recess 14 which enables the withdrawal of the stirrup and of the friction pads. It is then very easy to remove the friction pads and replace them by new ones.

After replacement of the friction pads, the levers are rocked in opposite directions and they are lifted through the intermediary of the cranks 114 until the holes 116 formed in the levers and the holes of the same diameter formed in the limbs of the fixed support, come in registry and are fit to receive the pin 38. The pin 38 equipped with the washer 112 is then mounted and is locked in place by the split ring 108. As shown on FIG. 4, it is possible to provide a sleeve 118 fixed to the limbs of the fixed support and through which extends the pin 38, this sleeve acting as a cross member for the limbs of the fixed support and for the lever arms.

Thus, the floating stirrup will act as a coherent unit positively guided by the fixed support with the anchorage ends of the friction pads arranged so that the reinforcement metal plate 67, as well as the friction lining, will together transmit braking torque to the fixed support. In particular, this torque is transmitted by the edges 120 on the metal plate 67, which edges 120 extend to contact the inner surface of the groove 69 adjacent the vertical element 30. It has been observed that if the anchorage edges were formed by friction material alone, and, if there were particularly large anchorage edges, crushing or distortion of the friction lining can result in the formation of chips or particles that will penetrate into the guiding interstices and connections to cause a defective operation of the brake. It is to be noted that the straight sides of the friction pad enables the friction pad to come into engagement with the perpendicular edges of the recess formed in the fixed support, without having to machine a seat at this crossing spot.

It is possible to increase the rigidity of the metal reinforcement plate 67 namely by means of ribs formed on its whole area or locally for instance on the portions extending on the respective sides of the stirrup. The metal plates 67 may have a conformation which enables the friction pads to be moved with respect to the stirrup not only in the radial direction but also in the peripheral direction. With this object, the hole formed in the metal plate 67 of the friction pad adjacent to the piston and the two holes in the metal plate of the friction pad adjacent to the stirrup pressure member have a diameter which corresponds substantially to the diameter of the coupling members formed on the piston on the one hand and on the pressure plate on the other hand. There is realized a floating saddle in which the friction pads are positively connected to the stirrup.

Although one embodiment of the invention was described in the above specification, numerous modifications will be apparent to the man skilled in the art. It is thus possible to vary the positions of the pivotal pin and of the safety pin. Torsion or compression springs could also be used. All these modifications come within the scope of the patent protection.

What is claimed is:
1. A disc brake comprising a rotating disc, a U-shaped fixed support including two limbs located on the opposite sides of said disc, an outwardly opening recess formed in said limbs, a pair of friction pads located in said recess and cooperating with the opposite friction surfaces of the disc, a floating stirrup including an actuator operatively connected to the adjacent friction pad and a pressure member operatively connected to the second friction pad, a pair of levers pivotally mounted at their outer end thereof on the fixed support at the opposite sides of the said recess and the inner ends of which extend in operating position of said levers over the outer periphery of said recess over the adjacent portions of the stirrup, a pin removably mounted on the fixed support and providing the pivotal connection at the outer end of said levers, a safety pin permanently secured to each lever, an opening formed in the fixed support and through which extends the safety pin, said opening having a size larger than that of the safety pin, a pair of springs respectively connecting the inner-end of said levers to the fixed support, and biasing in operating position of the levers the stirrup inwardly with respect to said recess and thus apply the friction pads onto a seat formed at the bottom of said recess as well as create a clearance between the safety pin and the said opening, the latter having a size enabling a pivotal movement of said levers within a predetermined range which is however insufficient to enable an escape of the stirrup from the recess, the attachment point of said springs to the respective levers, being selected at such a distance from the safety pin, that upon withdrawal of the removable pin, and rocking said levers towards the opposite side of the safety pin, the said springs are subjected to a load of the same order as that to which the springs are subjected when the levers are in operating position.

2. A brake according to claim 1 in which the inner ends of the levers are formed with an extension, a block of plastic material carried by said extension, and a seat on each side of the stirrup engaged by said block of plastic material.

3. A disc brake comprising a rotating disc, a U-shaped fixed support including two limbs located on the opposite sides of said disc, an outwardly opening recess formed in said limbs, a pair of friction pads located in said recess and cooperating with the opposite friction surfaces of the disc, a floating stirrup including on one side of the disc an actuator operatively connected to the adjacent friction pad and on the opposite side of the disc a pressure member operatively connected to the second friction pad, a pair of levers each formed by a pair of arms extending parallely to the outer surface of said limbs, pivoted at the outer end thereof on these limbs and the inner ends thereof extend in operating position of the levers over the outer periphery of the said recess, an extension of said levers projecting over the adjacent portions of the stirrup, a block of plastic material carried by said extension, a pin removably mounted in said limbs and providing the pivotal connection at the outer end of each of said levers, a safety pin permanently secured to said arms and extending through aligned openings formed in said limbs, said openings having a size larger than that of the safety pin, a pair of springs respectively connecting the inner end of said arms to the fixed support and biasing inwardly, in operating position of the levers, the said blocks of plastic material into engagement with seats formed on the corresponding portions of the stirrup and thus applying the friction pads onto respective seats formed at the bottom of said recess as well as creating a clearance between the safety pins and the respective said openings, the latter having a size enabling a pivotal movement of said levers within a predetermined range which is however insufficient to enable an escape of the stirrup from the recess, the attachment point of said springs to the respective arms being selected at such a distance from the safety pin, that upon withdrawal of the removable pin and rocking said levers towards the opposite side of the respective safety pins, the said springs are subjected to a load of the same order as that to which these springs are subjected when the levers are in operating position.

4. A disc brake according to claim 3 in which the actuating elements of the stirrup are connected to the adjacent friction pads by means of a coupling comprising a wedge-shaped opening formed in a friction pad reinforcement plate and tapering towards the friction lining, a coupling member connected to the respective actuating element and extending into said opening, a groove on the coupling member and a yielding member inserted into said groove and which is in engagement with the wall of said wedge-shaped opening.

5. A disc brake according to claim 3 in which the stirrup includes a blind cylinder, a cylindrical piston located in said cylinder and formed with a blind recess, a washer and a cup taking abutment on the periphery thereof onto the said washer being secured in the mouth of the said recess, said washer and cup assembly forming a housing therebetween being formed with aligned holes, a pin secured to the cylinder head and extending through the said holes into said recess, a friction ring engaging said pin and located in said housing, a circular groove formed on the inner periphery of the cylinder, an O-ring of plastic material located in said groove in engagement with said cylindrical piston, the distortion of said O-ring being adapted to bring the friction ring into abutment with the said washer when the brake is released, the distance between the friction ring in said abuting position and the bottom of the cup defining the amplitude of the brake clearance.

6. A disc brake according to claim 3 including a head on the removable pin, a yielding washer between said head and the adjacent lever arm, a groove on the opposite end of said pin and a locking ring in said groove.

7. A disc brake comprising a rotating disc, a fixed support including limb means, an outwardly opening recess formed in said limb means, a friction pad means located in said recess and cooperating with opposite surfaces of the disc, a floating stirrup means, an actuator means operatively connected to said stirrup and to said friction pad means, a lever means pivotally mounted at its outer end on said fixed support adjacent said recess, said lever means having an inner end which extends in an operating position over the outer periphery of said recess to operatively engage the stirrup means, a first pin means removably mounted on the fixed support and providing a pivotal connection at the outer end of said lever means, a second pin means secured to said lever means, said second pin means operatively connecting said lever means to said fixed support through an oversized opening in said fixed support, a spring means respectively connecting the inner end of said lever means to said fixed support means, and biasing said inner end against said stirrup means to locate said stirrup means inwardly with respect to said recess which in turn locates said friction pad means on a seat formed at the bottom of said recess in which position said second pin means will be spaced from the sides of said opening in said fixed support allowing a pivotal movement of said lever means within a predetermined range with said second pin preventing escape of said stirrup means from said recess at the same time, said spring means being attached at a point on said lever means at a distance from said second pin means that is less than that from said first pin means to permit rocking of said lever means after removal of said first pin to displace the axis of said spring means towards the opposite side of the second pin means, so that said spring means is but slightly extended and released to a length of the same order as that where said spring means is holding the lever means in an operating position engaging said portions of said stirrup means.

No references cited.

MILTON BUCHLER, Primary Examiner.

G. E. A. HALVOSA, Assistant Examiner.